United States Patent
Jann et al.

(10) Patent No.: US 10,152,204 B2
(45) Date of Patent: Dec. 11, 2018

(54) CREATING DYNAMIC MNEMONICS

(71) Applicant: SAP SE, Walldorf (DE)

(72) Inventors: Florian Jann, Heidelberg (DE);
Michael Krenkler, Wiesloch (DE);
Emil Voutta, Heidelberg (DE); Annette Jann, Heidelberg (DE); Leif Jensen-Pistorius, Oestringen (DE);
Peer Hilgers, Grasellenbach (DE);
Martin Wezowski, Berlin (DE);
Kathrin Fischer, Philippsburg (DE);
Kai Richter, Muehltal (DE)

(73) Assignee: SAP SE, Walldorf (DE)

( * ) Notice: Subject to any disclaimer, the term of this patent is extended or adjusted under 35 U.S.C. 154(b) by 116 days.

(21) Appl. No.: 14/981,917

(22) Filed: Dec. 29, 2015

(65) Prior Publication Data
US 2017/0185242 A1    Jun. 29, 2017

(51) Int. Cl.
| | |
|---|---|
| *G06F 3/048* | (2013.01) |
| *G06F 3/0482* | (2013.01) |
| *H04L 29/06* | (2006.01) |
| *G06F 3/0486* | (2013.01) |
| *G06F 3/0481* | (2013.01) |
| *G06F 17/24* | (2006.01) |
| *G06F 8/34* | (2018.01) |
| *G06F 9/451* | (2018.01) |

(52) U.S. Cl.
CPC .......... *G06F 3/0482* (2013.01); *G06F 3/0486* (2013.01); *G06F 3/04812* (2013.01); *G06F 3/04817* (2013.01); *G06F 8/34* (2013.01); *G06F 9/451* (2018.02); *G06F 17/248* (2013.01); *H04L 65/403* (2013.01)

(58) Field of Classification Search
CPC ...... G06F 17/212; G06F 17/24; G06F 17/211; G06F 3/0482; G06F 3/0486; G06F 3/04812; G06F 3/04817; G06F 3/248; G06F 3/34; G06F 3/451; H04L 65/403
USPC ........................................................ 715/202
See application file for complete search history.

(56) References Cited

U.S. PATENT DOCUMENTS

| | | | | |
|---|---|---|---|---|
| 2007/0208669 | A1* | 9/2007 | Rivette | G06F 17/30011 705/59 |
| 2009/0307607 | A1* | 12/2009 | Schauls | G06F 3/0483 715/752 |
| 2013/0047115 | A1* | 2/2013 | Migos | G06F 17/241 715/776 |
| 2014/0279224 | A1* | 9/2014 | Bridges | G06F 17/30265 705/26.35 |
| 2017/0132200 | A1* | 5/2017 | Noland | G06F 17/248 |

* cited by examiner

*Primary Examiner* — Scott T Baderman
*Assistant Examiner* — Hassan Mrabi
(74) *Attorney, Agent, or Firm* — Fish & Richardson P.C.

(57) ABSTRACT

Various embodiments of systems and methods for generating mnemonics are described herein. In an aspect, the method includes receiving a trigger for a mnemonic. Upon receiving the trigger, a menu including options for creating the mnemonic is displayed. A selection of an option from the menu is received for creating the mnemonic. Based upon the selection of the option, one or more pop-up windows for creating the mnemonic is rendered.

19 Claims, 12 Drawing Sheets

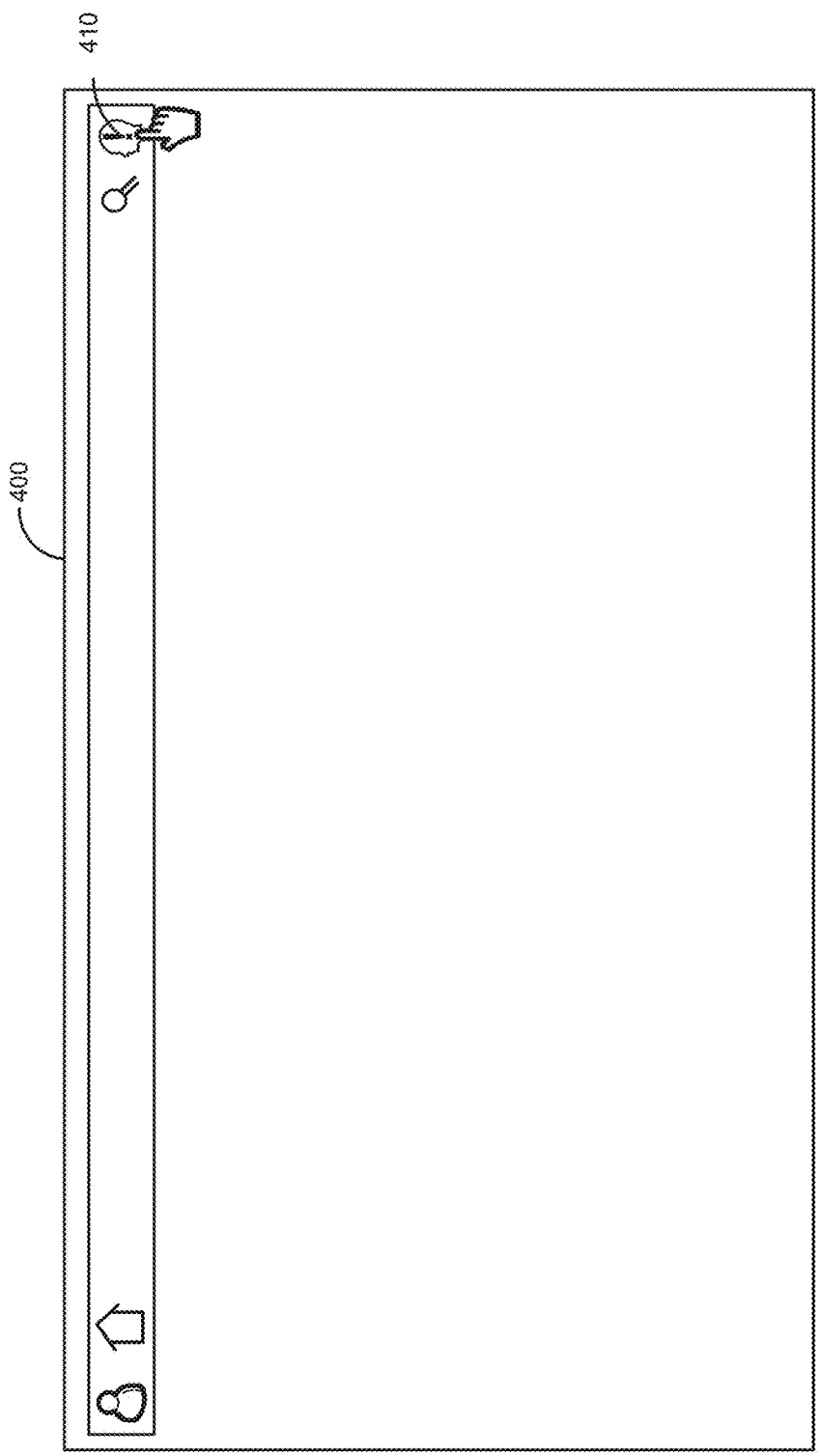

CREATE SALES COURT

WHAT IS IN YOUR MIND?

NEW SALES QUOTE

| ACCOUNT | POWER STEAM |
| --- | --- |
| VALID | 02.02.2015 |
| SUCCESS CHANCE | 100% |
| CAMPAIGN | WG STARTER CAMPAIGN |
| EXTERNAL NOTE | |
| INTERNAL NOTE | |

TYPE PRODUCT NAME

SUM: 0.00

CREATE QUOTE | SAVE AS TILE
SAVE AS TEMPLATE
SHARE

4H AGO 400
440
470

FIG. 4D

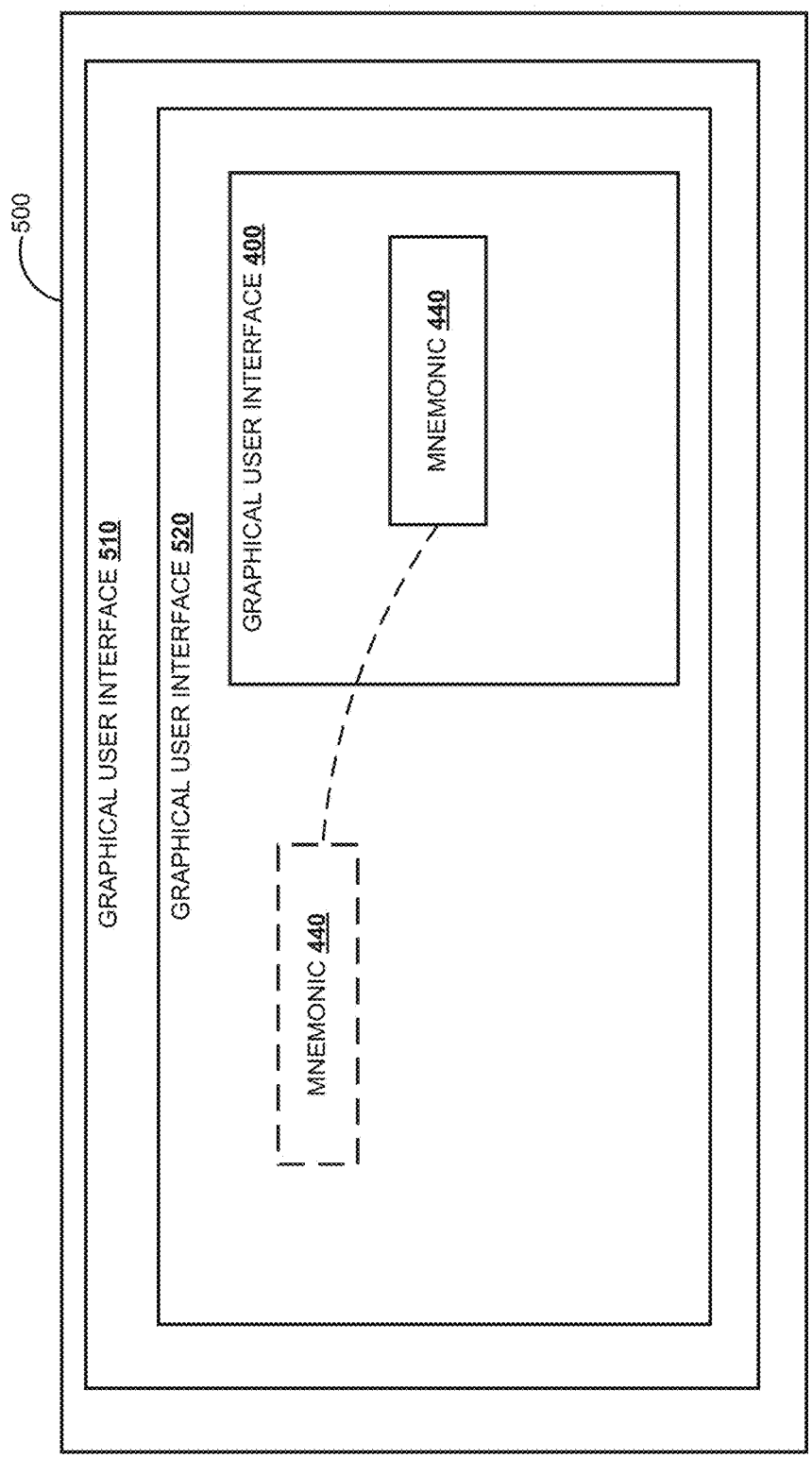

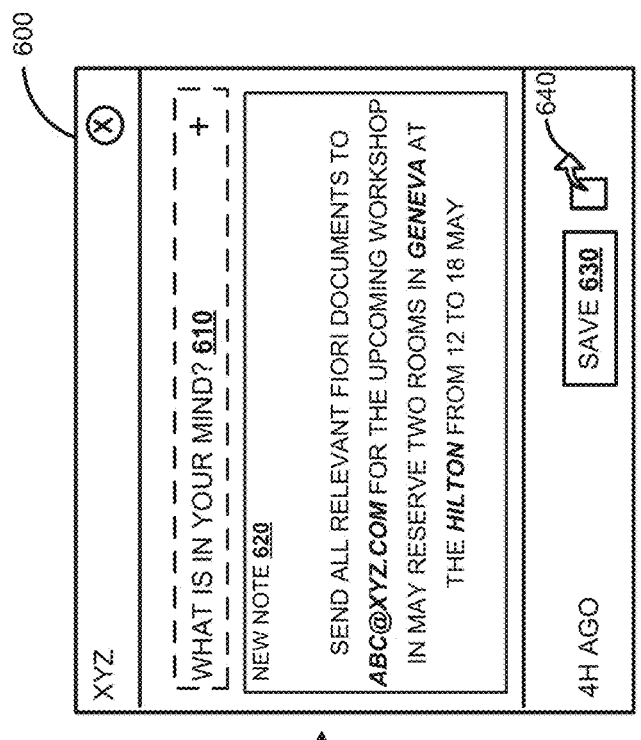
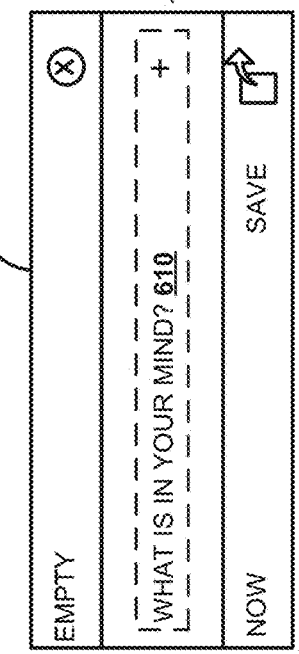
FIG. 6B
FIG. 6A

CREATING DYNAMIC MNEMONICS

BACKGROUND

Today users are multi-tasking and working on various contexts. Usually, the users are required to switch from one context to another. For example, a user processing a sales order might get interrupted, e.g., by a client's call, and might be required to switch to a different user interface (UI) or context, e.g., to create a new sales order based upon the client's requirement/request. While switching from one context to another, the user might forget or lose track of a previous task. Sometimes, the previous task gets interrupted or lost. The user might compose notes, e.g., sticky notes, as a memory aid to recollect the previous context and information related to the previous interrupted or lost task. However, dropping current work activity to compose notes on paper or to switch to a different UI to compose electronic sticky notes might be inconvenient and inefficient. Further, work-focus might get lost or interrupted if it is required to write the notes immediately. Moreover, entering data later from sticky notes into an application (interrupted task) again is a repetitive and an arduous task.

BRIEF DESCRIPTION OF THE DRAWINGS

The embodiments are illustrated by way of examples and not by way of limitation in the figures of the accompanying drawings in which like references indicate similar elements. The embodiments may be best understood from the following detailed description taken in conjunction with the accompanying drawings.

FIGS. 4A-4D illustrate exemplarily graphical user interfaces of a software application including mnemonic feature, according to an embodiment.

FIG. 5 is a block diagram of an exemplary screen including graphical user interfaces and the mnemonic as a floating overlay, according to an embodiment.

FIGS. 6A-6D illustrate various visual designs of the mnemonic, according to an embodiment.

Like reference symbols in the various drawings indicate like elements.

DESCRIPTION

Figure 1:
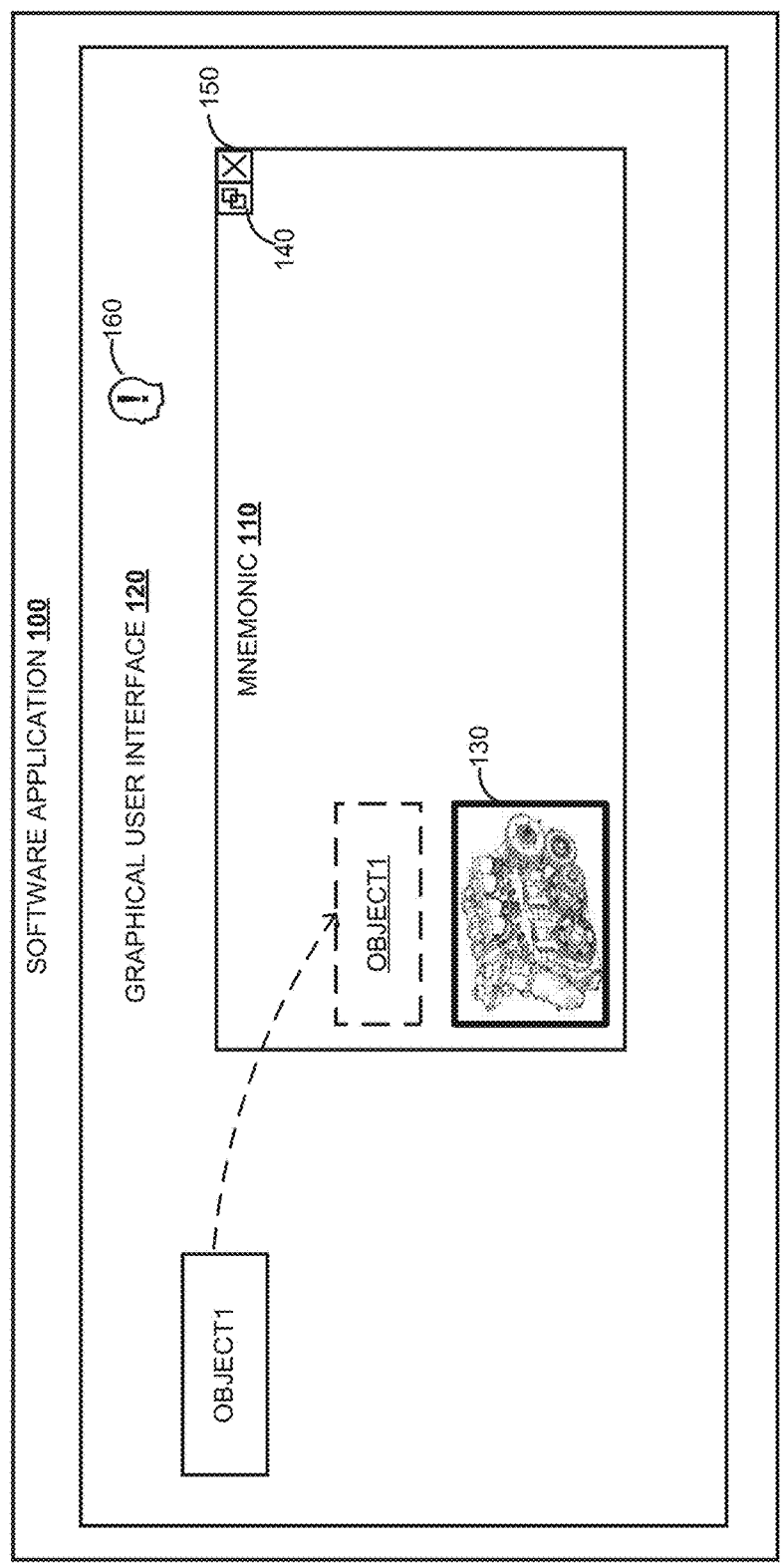
FIG. 1 is a block diagram illustrating an exemplary software application including a mnemonic as a memory aid for assisting users working on the software application, according to an embodiment.

Embodiments of techniques for mnemonics are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

"Device" refers to a logical and/or a physical unit adapted for a specific purpose. For example, a device may be at least one of a mechanical and/or an electronic unit. Device encompasses, but is not limited to, a communication device, a computing device, a handheld device, and a mobile device such as an enterprise digital assistant (EDA), a personal digital assistant (PDA), a tablet computer, a smartphone, a smartwatch, and the like. A device can perform one or more tasks. The device includes computing system comprising electronics (e.g., sensors) and software. The device is uniquely identifiable through its computing system. The device can access internet services such as World Wide Web (www) or electronic mails (E-mails), and exchange information with another device or a server by using wired or wireless communication technologies, such as Bluetooth, Wi-Fi, Universal Serial Bus (USB), infrared and the like.

"Process" refers to a set of linked procedures or activities which are collectively executed (in series or parallel) to realize an objective or a goal. For example, a process "production" or "order management" may comprise three linked procedure namely "sales quote," "purchase order," and "sales order" which are executed in series to realize "order management" process. At any point of time the process (e.g., order management) may be at a distinct procedure or step. A current procedure or a step of the process at any instance of time is referred as "process state."

"Sales quote" refers to a step of the process "production" or "order management." A "sales quote" is a quotation or cost involved for a product or services provided by an enterprise, i.e., seller or supplier. Sales quote may be created and sent to prospective or potential customer (buyer) for their perusal/approval. Once sales quote is accepted or approved by the buyer, the buyer can send a "purchase order." "Purchase order" or PO refers to a commercial document issued by the buyer to the supplier, indicating types, quantities, and agreed prices for the product or the services. Sending the PO to the supplier may constitute a legal offer to buy the product or the services from the supplier. Once the PO is received by the supplier, the supplier sends a "sales order." "Sales Order" or SO refers to a confirmation document sent to the buyer before delivering the product or services. The SO can be created once the PO is received from the buyer.

"Software application" or "application" refers to a software program which is used to execute a process. The software application may be an "on premise" application or may be provided as "on-cloud" solution. The software application may be an interactive application and includes one or more graphical user interfaces (GUIs) to allow users to execute various steps of the process. For example, a software application for the "order management" may include different GUIs for executing different steps (e.g., "sales quote creation" and "sales order creation," etc.). The software application can be installed on any device, e.g., any mobile or portable device, desktop, laptop, etc.

"Entity" or "object" refers to a "thing of interest" for which data is to be collected. For example, an entity may be a customer, an employee, a sales quote, a sales order (SO), a purchase order (PO), an account name or number, a contact, etc. The entity may be related to a process, for example, the entity "SO," "PO," and "sales quote" may be related to the "production" or "order management" process. The entity comprises one or more attributes, properties, or features that characterize the entity. For example, the entity "sales quote" may comprise attributes such as "account name" or "account number" (indicates the account to which the sales quote has to be created), "valid date" (indicates the date of expiry or validity of the sales quote), "success chance" (indicates chance of success of sales quote or chance the buyer will accept the sales quote or offer), "campaign" (indicates planned sales strategy), etc.

"Mnemonic" refers to an artifact which serves as a memory aid, e.g., a smart digital sticky-notes. "Mnemonic" can be embedded in a software application and one or more GUIs of the software application. The mnemonic can be composed, saved, and shared from any device where the software application is installed or from which the software application can be accessed. Mnemonics can be of various types, e.g., a note type, a reminder type, an object type, a process type, and a task type, etc. The mnemonic may contain texts and may act like a note or a remainder, a collection of objects and act like an object or collection of objects. The mnemonic may contain an instruction or step (e.g., need to check with M if the change is OK->get an approval) and act like a task or may contain one or more linked instructions, steps, or tasks, and acts like a process. Mnemonic of one type can be converted to another. For example, a note (note type mnemonic) may be converted to an object (object type mnemonic). The note may be converted to the object by including one or more objects into the note or by saving the note as an object. In an embodiment, a new object may be generated from the note comprising multiple objects. Any form of mnemonic (note, reminder, object collection, process, etc.) can be used as an input to create other object. For example, a mnemonic (process, note, reminder, task, etc.) may be used to create another object or may be included in an already existing object.

"Mnemonic" may gradually grow and can be easily turned into "collection of objects." In an embodiment, turning into collection of objects refers to including different types of object into the mnemonic. For example, the user may add or include different types of objects such as a "product," an "account," a "contact," etc., into the mnemonic. The objects included within the mnemonic may be homogenous, i.e., objects of same type (e.g., "product" type) or heterogeneous, i.e., objects of different types (e.g., "product" type, "contact" type, "account" type, etc.). Therefore, the mnemonic acts as a container or collection of objects. In an embodiment, the mnemonic may itself be saved or used as an object.

"Mnemonic" may contain various display and/or action elements. The action elements may be generic (e.g., open and close buttons are generic action element) or may be context-specific (e.g., approve and reject button for leave request are context-specific action element). The display element may comprise contents (e.g., objects) from the UI and/or input data from components (e.g., camera, microphone, etc.) which are available through the device. The content (e.g., objects) can be easily included within the mnemonic, e.g., using UI operations such as drag-and-drop. The content (e.g., object) may be included as selectable data (e.g., as hyperlink) and can be easily and directly accessible from the mnemonic. "Mnemonic" can be created from a given context or stand-alone. When created from a context the mnemonic takes over as much information as possible to simplify the users input process. A list comprising mnemonic created by a user may be stored and easily accessible or available for the user's reference. Contextually filtered lists of mnemonic can also be available for reference when working for a given context. The mnemonics may be stored at a place and a filter option may be provided to filter the stored mnemonics based upon the context, the user, the type of the mnemonic (e.g., note, reminder, etc.), etc.

Working on a mnemonic can easily be halted and later resumed. When in edit mode a mnemonic floats above or hovers over a content and can be moved around a user interface (UI) or a screen. While navigating through the application, the mnemonic may be simultaneously open across different screens and objects. Mnemonic appears as a floating overlay on the UI. Therefore, the users is not required to leave the current context to work on the mnemonic. It can be moved to another position on the screen or simply be closed if the user needs to change his focus.

Various embodiments are described using exemplarily object "sales quote." A "mnemonic" and a "set of fields" within the mnemonic may vary depending on the configuration and definition of the object provided by a business enterprise. It may be understood that the embodiments may be applicable and extended to any other object.

FIG. 1 is a block diagram illustrating exemplary software application 100 including mnemonic 110, according to an embodiment. The application 100 may be designed to execute a process, e.g., a production process or an order processing process. The application 100 may include one or more graphical user interfaces. For example, the application 100 includes a graphical user interface (GUI) 120. A user may work on/through the one or more GUIs. The user may switch from one GUI to another for entering data, referring information, etc. The GUIs of the application may be embedded with mnemonics feature. When the GUI 120 is embedded with the mnemonics feature, a mnemonic icon 160 may be displayed on the GUI 120. The mnemonic icon 160 may be triggered or selected to initiate a mnemonic 110. In an embodiment, initiating the mnemonic refers to creating the mnemonic. The mnemonic 110 assists the user in performing various tasks. For example, the mnemonic 110 may help in composing notes, composing reminders, creating objects, creating processes (e.g., small ad-hoc processes), sharing and reusing the composed notes, reminders, objects, and/or processes, etc. Mnemonic 110 may be created by the user based upon their requirement. For example, the user may create mnemonic 110 as a note, a reminder, an object, a task, or a process based upon the requirement. The mnemonic 110 may include various display and action elements. In an embodiment, the mnemonic refers to a mnemonic pop-up including the action and/or display elements.

The action elements enable user to perform processing or action on the mnemonic, e.g., close, continue, next, maximize, minimize, etc. The action elements may be generic such as a 'maximize' button 140 and a 'close' button 150 or may be context-specific such as 'approve' button (not shown) or 'reject' button (not shown) in context of 'order processing.' The display elements may include contents from the GUI 120 (e.g., object1) and/or input data (e.g., image 130) from components (e.g., camera) of a device (not shown) including the software application 100. The content (e.g., object1) may be included within the mnemonic 110, e.g., using UI operations such as drag-and-drop, selection from a menu, etc. The content and/or the input data may be included as selectable data (e.g., as hyperlink) and can be accessible from the mnemonic 110. The selectable data/content is shown as 'underlined' text, e.g., underlined object1 within the mnemonic 110.

Figure 2:
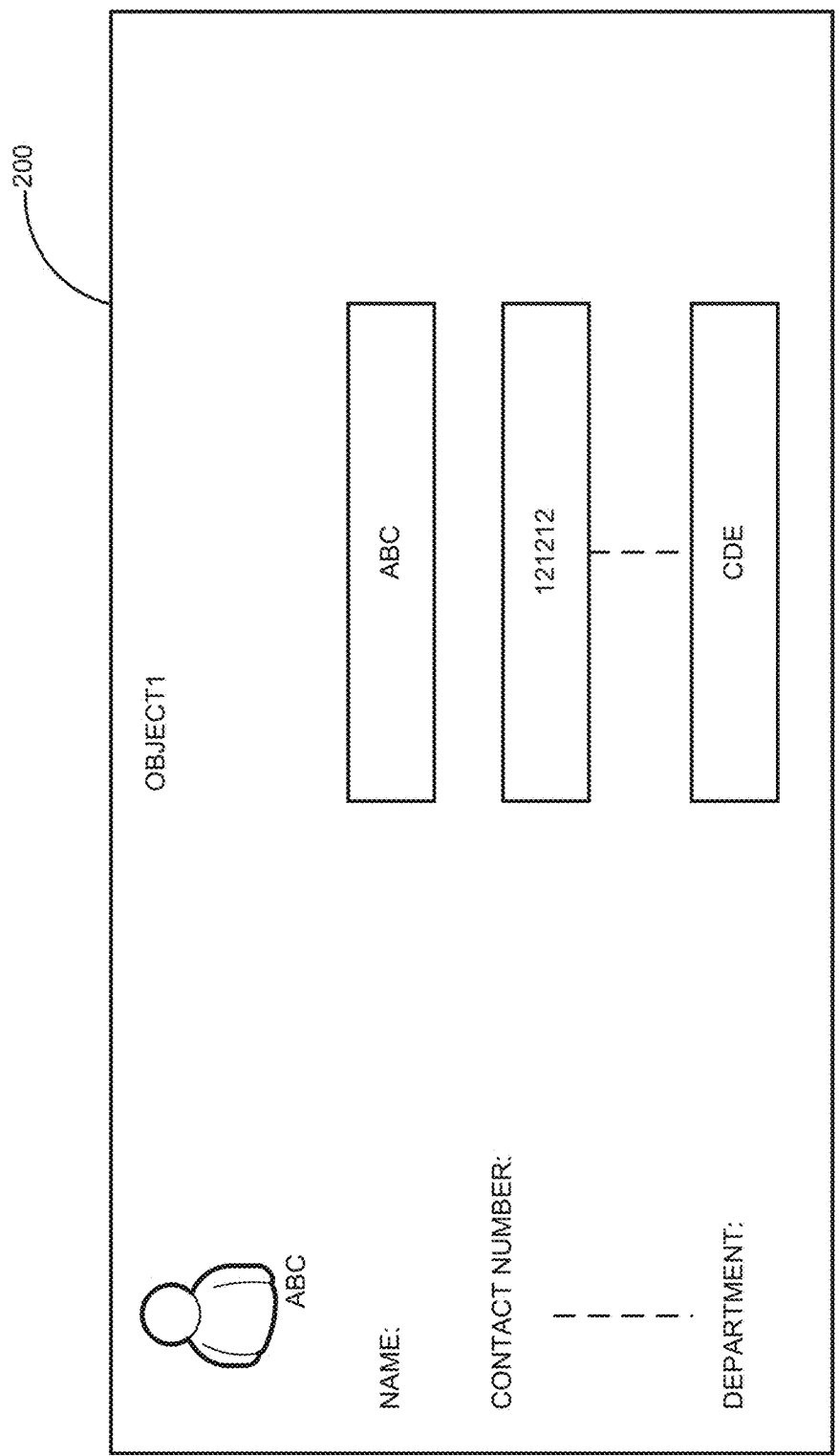
FIG. 2 illustrates a graphical user interface rendered upon selection of a selectable object from the mnemonic, according to an embodiment.

FIG. 2 is a block diagram of a graphical user interface 200 rendered upon selection of a selectable object (object1) from the mnemonic 110, according to an embodiment. When selectable "object1" is selected, the GUI 200 is rendered. The GUI 200 is related to the selected object1. If the object1 refers to an employee (name: ABC) responsible for handling sales quotes, the GUI 200 may include information related to the employee ABC. The GUI 200 displays the object1, i.e., information of the employee ABC including contact number, department, address, etc. Therefore, the selectable data such as object1, included within the mnemonic 110, may be easily and directly accessed from the mnemonic 110.

In an embodiment, the mnemonic 110 includes data which is entered, selected, or provided by the user. The user may enter the data within the mnemonic 110 using various interaction method, including but not limited to, menu-based interaction to enter data by selecting an option (object, process, note, contact, etc.) from the menu, drag-and-drop operation to select and drag the content (object, process, contact, etc.) from the GUI into the mnemonic, or typing based on content or object recognition assistance to select from automatic suggestions provided while composing the mnemonic. The suggestions may be provided based upon the context such as the GUI or the software application of current work. For example, if objects 'mno,' 'mrz,' and 'pqr' are defined in relation to a sales quote within the software application 100 and the mnemonic is being created for the sales quote within the software application 100 then upon typing 'm,' automatic suggestions of objects 'mno' and 'mrz' may be provided to enable the user select the desired option (object) from the suggestion without much typing or remembering.

In an embodiment, the automatic suggestion is provided or rendered by retrieving data from one or more databases (not shown) through a backend engine. The backend engine is communicatively coupled to a UI rendering engine (not shown). The UI rendering engine may send context reference (e.g., one or more keywords related to the context) to the backend engine. The backend engine identifies the context. Based upon the identified context, the backend engine determines and retrieves suggestion (e.g., data, text, object, etc.) from the one or more databases. The retrieved suggestion is sent to the UI rendering engine and the UI rendering engine renders the suggestion on the GUI. The user can select the desired option (object) from the suggestion to compose or create the mnemonic.

The mnemonic may be context-specific or stand alone. In an embodiment, the context-specific mnemonic includes one or more objects or processes related to the context. In an embodiment, the context-specific mnemonic may be automatically recognized based upon or through one or more keywords, object, and/or process used in the mnemonic. In an embodiment, the context-specific mnemonic may be automatically recognized based upon a name of the mnemonic which may also represents the context. The context-specific mnemonic may be created when the mnemonic is created in relation to a current GUI or current work context. In an embodiment, the context-specific mnemonic may be segregated and stored together based upon their context. In an embodiment, the created mnemonics may be stored and a filter option may be provided to filter the stored mnemonics based upon the context, the user, the type of the mnemonic (e.g., note, reminder, etc.). The user may narrow down or filter the list of mnemonics to the current context.

Figure 3:
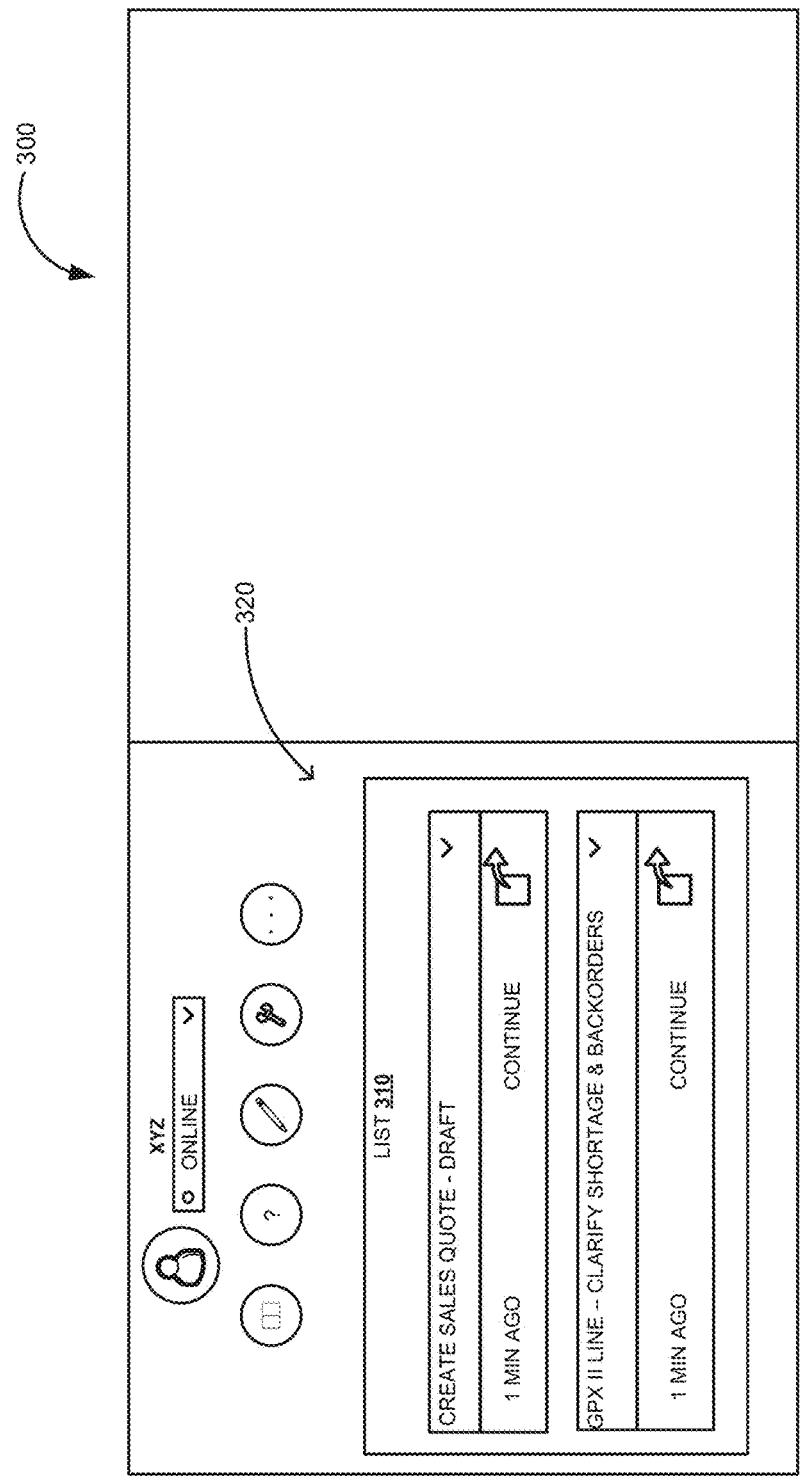
FIG. 3 illustrates a list including one or more mnemonics created by a user, according to an embodiment.

FIG. 3 is a screenshot of a user interface 300 displaying a list 310 including one or more mnemonics created by a user 'XYZ.' The list 310 may be rendered on a left-hand-side 320 of the GUI 300. The user can easily reuse or refer to the mnemonics previously created by him/her. For example, the user XYZ can refer to the mnemonic created by him/her through the list 310. In an embodiment, a list (not shown) of contextually filtered mnemonics may be rendered. For example, if the current work context is 'order processing,' then a list (not shown) including the mnemonics related to 'order processing' may be rendered for reuse or reference, e.g., on the left hand side of the GUI. In an embodiment, the context-specific mnemonic is automatically recognized, based on, e.g., one or more keywords related to the context, and retrieved. In an embodiment, a list (not shown) including all the created mnemonics may be displayed and a filter option may be provided to enable user filter the list based upon the context, the user created mnemonics, and the type of mnemonic (object, process, task, etc.).

Figure 4B:
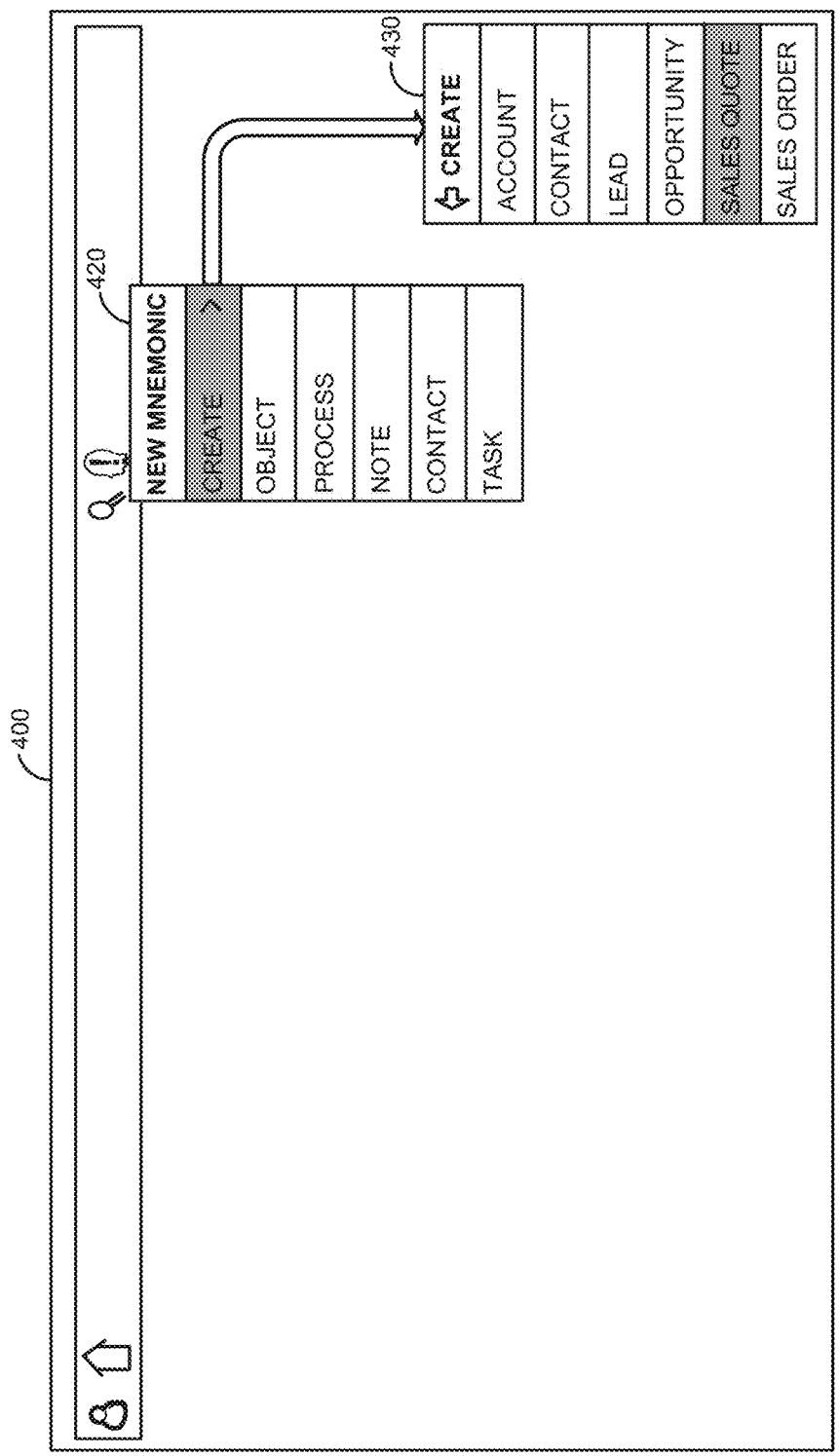

FIGS. 4A-4D illustrate exemplarily graphical user interfaces of a software application (not shown) embedded with mnemonic feature, according to an embodiment. When the mnemonic feature is included in the software application, one or more GUIs of the software application gets embedded with mnemonic feature or mnemonic. FIG. 4A illustrates a graphical user interface (GUI) 400 including the mnemonic feature. When the mnemonic feature is embedded in the GUI 400, a mnemonic icon 410 is rendered on the GUI 400. When the mnemonic icon 410 is selected, a new mnemonic menu 420 (FIG. 4B) is rendered. The new mnemonic menu 420 displays options for creating a mnemonic. For example, the new mnemonic menu 420 includes options such as 'create,' 'object,' 'process,' 'note,' 'contact,' and 'task,' etc. The "object" option may be selected to load an existing (already defined) object into the mnemonic to create an object type mnemonic, the "process" option may be selected to load an existing process into the mnemonic to create a process type mnemonic, similarly, the "note," the "contact," and the "task" options may be selected to load an already existing note, contact, and task into the mnemonic to create "note," "contact," and "task" type mnemonic. The "create" option may be selected to quickly create a new mnemonic using the predefined template, e.g., the predefined template of the object, the process, etc.

Figure 4C:

When the 'create' option is selected, a create menu 430 is rendered. The create menu 430 provides various options for creating a new mnemonic. For example, the create menu 430 may provide one or more predefined objects (template) to quickly create 'object type' new mnemonic using the selected object (template). When an object, e.g., sales quote, is selected from the create menu 430, a sales quote template or a new mnemonic 440 (FIG. 4C) including predefined template of "sales quote" is rendered. The mnemonic 440 includes a set of predefined fields (e.g., account, valid date, success chance, campaign, etc.) related to the "sales quote" (selected object). Based upon the selection of the object, the number and set of fields varies. The mnemonic 440 also includes a list of one or more items or products including image of the item, its quantity, and discount (if any). The list may be created by selecting or entering product or item name in "type product name" field 480. Once the sales quote mnemonic 440 is created, the mnemonic 440 can be saved, e.g., using a 'save' button 450. In an embodiment, when some of the information or field information is incomplete, the mnemonic 440 can be saved as a draft, e.g., using an 'action' button 460. When the 'action' button 460 is selected, another menu 470 (FIG. 4D) is displayed. The menu 470 includes options such as 'save as draft' or 'save as template' to save the mnemonic as draft or template, 'save as tile' to save and display the mnemonic in tile of the GUI, and 'share' to forward or share the mnemonic 440 with one or more recipients. In an embodiment, when the 'share' option is selected, a pop-up or drop-down menu (not shown) including the names of one or more recipients may be rendered. The user may select the one or more recipients from the pop-up or drop-down menu and share the mnemonic 440 with the selected one or more recipients. The mnemonic 440 may be closed explicitly, e.g., using a close button 490 (FIG. 4C).

FIG. 5 illustrates exemplary screen 500 including the GUI 400, GUIs 510-520, and the mnemonic 440 as a floating overlay. The mnemonic 440 created upon the GUI 400 hovers over a content and can be moved around the GUI 400 or a screen (e.g., the screen 500) of the device. In an embodiment, the mnemonic 440 may float or hover when in an edit mode. While navigating through the software application, the mnemonic 440 may be displayed and clickable across different GUIs (e.g., the GUI 400, 510, and 520). The mnemonic 440 may be closed explicitly, e.g., using the close button 490 (FIG. 4C). Therefore, the users may not leave the current context or the GUI 400 to work on the mnemonic. The mnemonic 440 may be moved to another position (i.e., reposition shown with/as dashed lines) on the screen 500. In an embodiment, based upon display content, reposition options, and device orientation, the mnemonic 440 can be dynamically moved or repositioned. For example, based upon the device orientation (e.g., vertical orientation and horizontal orientation), the position or orientation of the mnemonic pop-up may change. The mnemonic's pop-up height or size depends on its content which may keep increasing or decreasing based upon the addition of data into the mnemonic 440 or the deletion of data from the mnemonic 440.

Figures 6C, 6D:
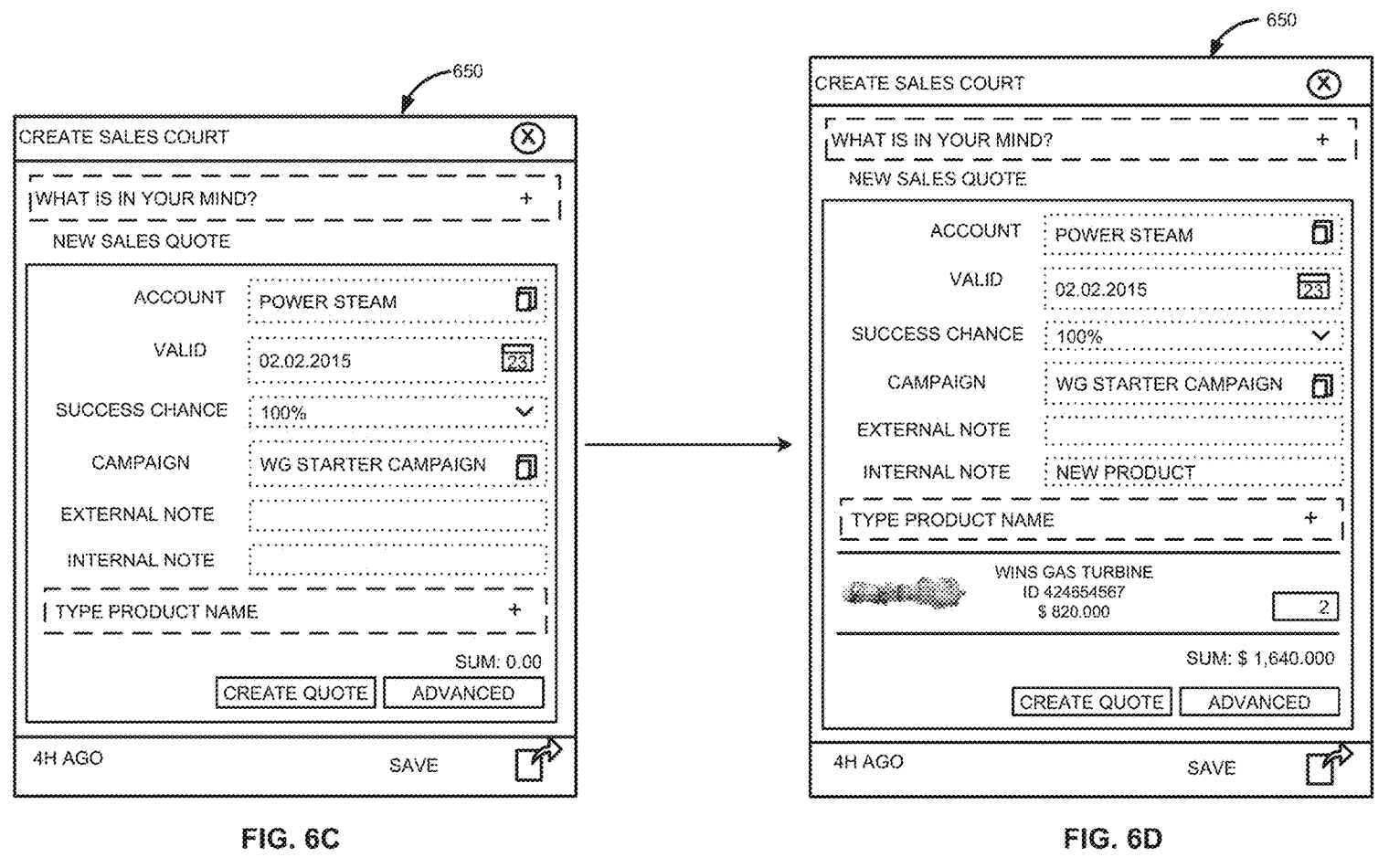

FIGS. 6A-6D are exemplary screenshots of GUIs illustrating a process for creating mnemonics, according to an embodiment. FIG. 6A illustrates a mnemonic 600 which is empty. The mnemonic 600 may be created as a 'note' type mnemonic. In an embodiment, while selecting an option for creating mnemonic (e.g., from the new mnemonic menu 420 of FIG. 4), the user may select 'note' option to load existing notes to create notes type mnemonic. In an embodiment, when the user selects the 'note' type mnemonic option (e.g., from the create menu 430 of FIG. 4B) to create a new note type mnemonic, the empty mnemonic 600 may be rendered. The mnemonic 600 may include a text entry area 610. The user may enter text or compose note in the text entry area 610. FIG. 6B illustrates the mnemonic 600 after the user has entered a note in a new note 620. The note may be entered by the user, e.g., as a reminder. The note may be created with object recognition. In an embodiment, object recognition implies that if the user types a note and mentions an object that is available in the system, the object is recognized and highlighted. In an embodiment, an automatic suggestions and context-specific inputs or objects are provided to help or simplify user's input process. The input or objects selected from the automatic suggestion may be included as selectable object/data. The selectable object or data selected from the auto-suggestion is shown as bolded text within the new note 620. The mnemonic 600 may be saved using a 'save' button 630. The mnemonic 600 may also be shared (e.g., send or forwarded) to one or more recipients using an 'action' button 640. When the 'action' button 640 is selected, a menu (not shown) including options such as 'save as tile,' 'save as template,' and 'share' may be rendered. When the option 'save as tile' is selected, the mnemonic 600 may be saved as tile and when the option 'save as template' is selected, the mnemonic 600 may be saved as a template.

FIG. 6C illustrates a mnemonic 650 created using an option 'QuickCreate' or 'Create,' e.g., through the new mnemonic menu 420 of FIG. 4B. When the 'Create' option is selected, various further options (e.g., one or more objects, e.g., through the create menu 430 of FIG. 4B) is rendered. One of the option (e.g., the object 'sales quote') may be selected, e.g., from the create menu 430 of FIG. 4B. Once the object 'sales quote' is selected, the mnemonic 650 for the object 'sales quote' is rendered to enable the user create a new sales quote. The mnemonic 650 (related to sales quote) includes predefined set of fields, e.g., account, valid date, success chance, campaign, etc. The set of fields varies based upon the selected object. FIG. 6D illustrates the mnemonic 650 including sub-object. When a sub-object (e.g., a product WINS GAS TURBINE ID 424654567) is added or included within the mnemonic 650, the visual designs (pop-ups) of the mnemonic 650 expands or grows.

Figure 7:
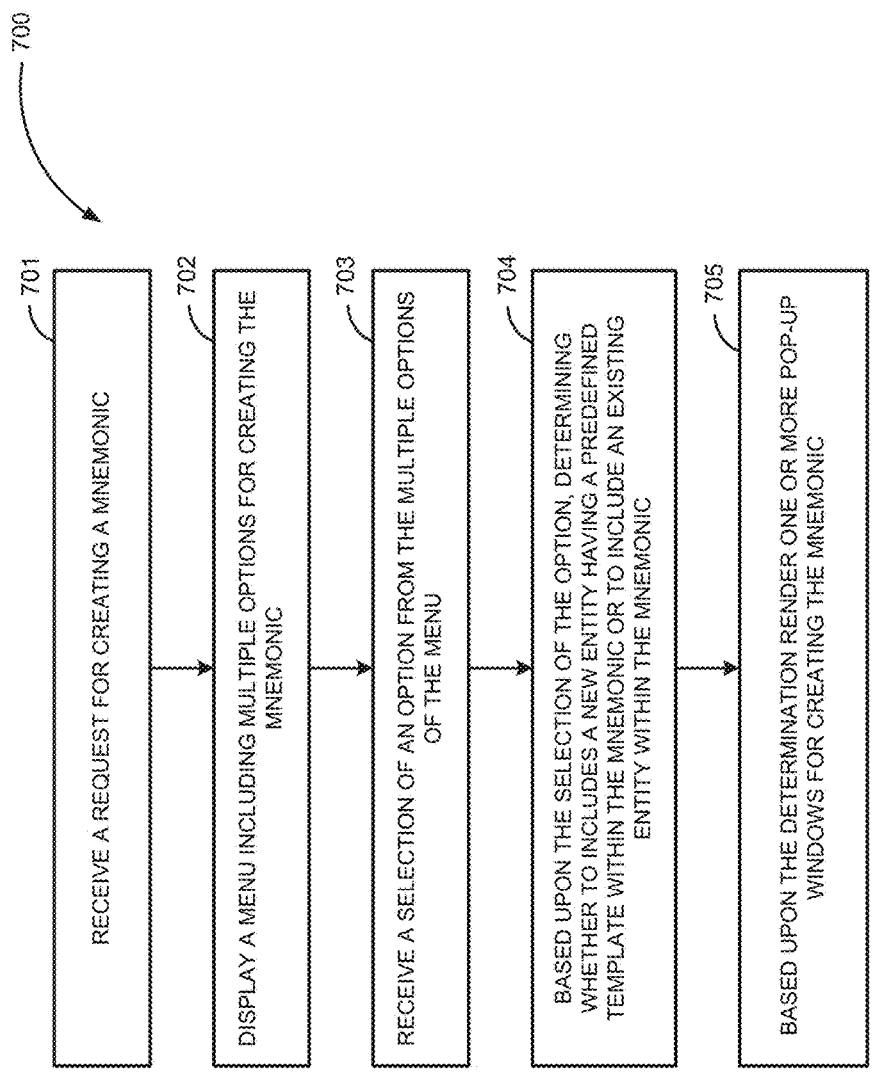
FIG. 7 is a flowchart illustrating a process of dynamically creating a mnemonic as a memory aid for assisting users working on a software application, according to an embodiment.

FIG. 7 is a flowchart illustrating process 700 to dynamically create a mnemonic in a software application including mnemonics feature. The graphical user interfaces (GUIs) of the software application includes mnemonic icon for creating mnemonics. At 701, a request is received for creating the mnemonic. The request may be received upon selection of the mnemonic icon (e.g., the mnemonic icon 410 of FIG. 4A). At 702, upon receiving the request, a menu (e.g., the new mnemonic menu 420 of FIG. 4B) including multiple options (e.g., create, object, process, note, contact, and task) for creating the mnemonic is displayed. At 703, a selection of an option from the multiple options is received for creating the mnemonic.

At 704, based upon the selection of the option, it is determined whether to include a new entity having a predefined template within the mnemonic or to include an existing entity within the mnemonic. For example, when the "object" option is selected, it is determined that an existing object would be loaded into the mnemonic to create the "object" type mnemonic. Similarly, when the "process" option, the "note" option, the "contact" option, and the "task" option is selected, it is determined that an existing process, note, contact, and task would be loaded or included into the mnemonic to create "process," "note," "contact," and "task" type mnemonic, respectively. Therefore, a type of the created mnemonic is one of an object, a process, a note, a reminder, and a task based upon the selection of the option for creating the mnemonic. When the "create" option is selected, it is determined that the new entity having the predefined template (e.g., the predefined sales quote template or mnemonic 440 of FIG. 4C) would be included within the mnemonic. The predefined template includes a set of predefined fields (e.g., account, valid date, success chance, campaign, etc., for predefined sales quote) which may be entered to create the mnemonic. The predefined template may be related to various entities such as the object, process, task, etc., and the user can select the entity of their choice. At 705, based upon the determination as to whether the new or the predefined entity is to be included within the mnemonic, one or more pop-up windows are rendered for creating the mnemonic. For example, when it is determined that the new entity having the predefined template is to be included within the mnemonic, a pop-up window (e.g., the predefined sales quote template or mnemonic 440 of FIG. 4C) is rendered.

Embodiments enable users (e.g., customers or end users) to dynamically create mnemonic (e.g., electronic notes) without moving away or losing focus from their current context or task. Mnemonic or notes related to different context can also be composed while working or remaining in the current context. The mnemonic can be composed, saved, updated, or closed easily. The mnemonic may be a floating overlay on a screen and can be fixed when desired. The mnemonic may be opened and floats or hovers across multiple UIs opened on the screen. The mnemonic comprises various display elements including various contents (e.g., objects) from a UI and/or input data from components (e.g., camera, microphone, etc.) which are available on/through a device (through which mnemonic is accessible). Entity or objects can also be easily added or included within the mnemonic, e.g., using user interface (UI) operations such as drag-and-drop. The object or entity may be included as hyperlink and can be easily accessible from the mnemonic. The mnemonic may keep growing and may be saved and used like an object or entity. The mnemonic also contain various action elements. The display and/or action elements may be generic (e.g., open button, close buttons, maximize button, minimize button, etc.) or may be context-specific (e.g., approve and reject button for leave request). The mnemonic may be dynamically moved, positioned, or repositioned anywhere on the screen.

The mnemonic may be created as context specific or stand-alone. The context specific mnemonic may be more easily and efficiently created as suggestions and context-specific inputs are automatically provided to help or simplify user's input process. A list including mnemonic created by a user may be segregated or stored and can be easily accessible or available for the user's reference or reuse. A list of contextually filtered mnemonic may also be maintained so that the mnemonic or notes related to a given context may be easily referenced or accessed. In an embodiment, a list comprising all created mnemonics is stored and a filter option is provided to filter the stored mnemonics based upon the context, the user, and the type of the mnemonic (e.g., note, reminder, etc.). In an embodiment, the mnemonic may also be directly shared, e.g., through email, communicator, or media sites, without moving away or losing focus from current context or task. Therefore, the mnemonic provides a very user-friendly, efficient, and flexible technique or memory aid for assisting and improving user's working experience.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" includes a single medium or multiple media that stores one or more sets of instructions. The term "computer readable storage medium" includes physical article that is capable of undergoing a set of physical changes to physically store, encode, or otherwise carry a set of instructions for execution by a computer system which causes the computer system to perform the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic indicator devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 8:
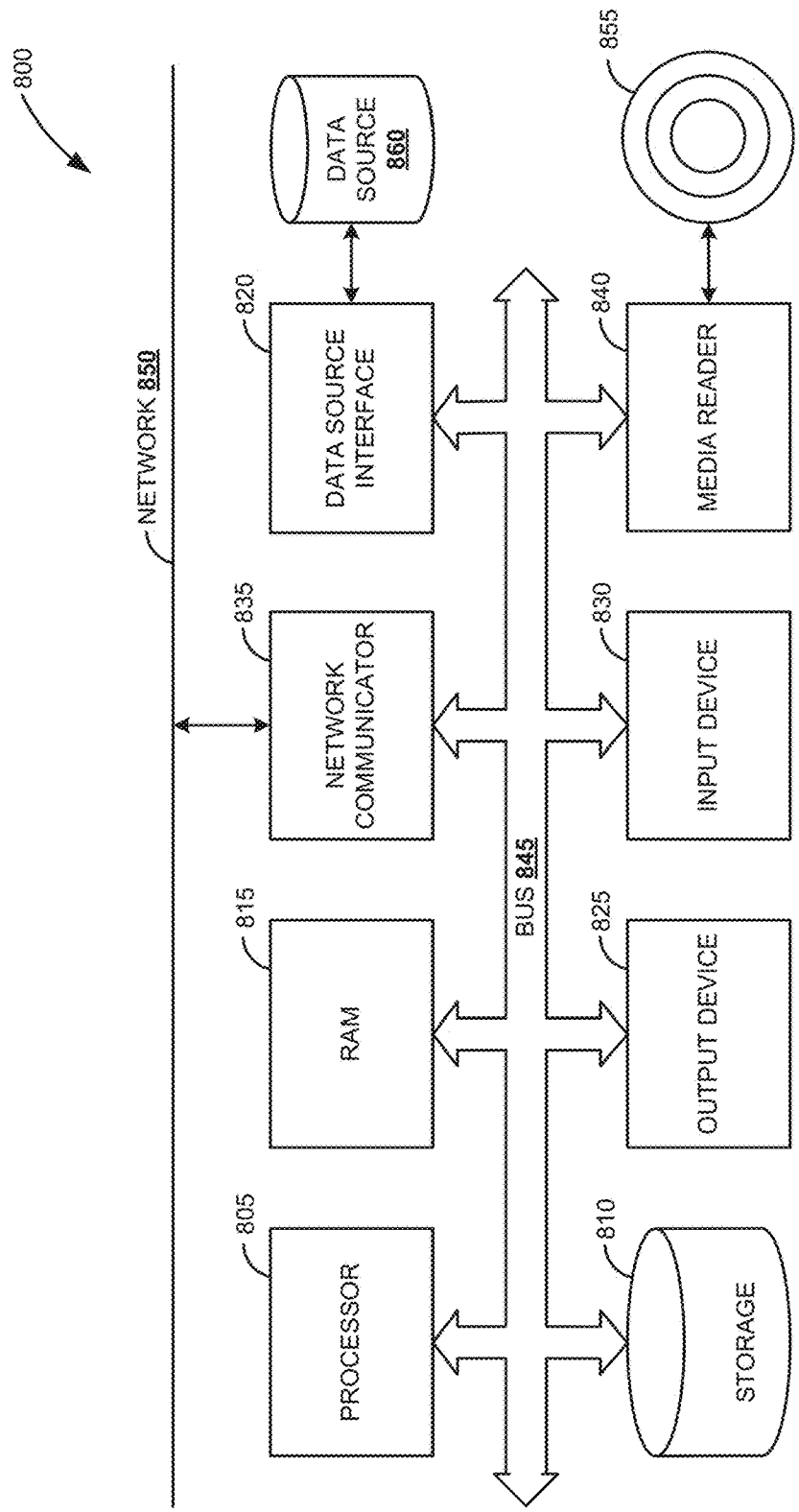
FIG. 8 is a block diagram illustrating an exemplary computer system, according to an embodiment.

FIG. 8 is a block diagram of an exemplary computer system 800. The computer system 800 includes a processor 805 that executes software instructions or code stored on a computer readable storage medium 855 to perform the above-illustrated methods. The processor 805 can include a plurality of cores. The computer system 800 includes a media reader 840 to read the instructions from the computer readable storage medium 855 and store the instructions in storage 810 or in random access memory (RAM) 815. The storage 810 provides a large space for keeping static data where at least some instructions could be stored for later execution. According to some embodiments, such as some in-memory computing system embodiments, the RAM 815 can have sufficient storage capacity to store much of the data required for processing in the RAM 815 instead of in the storage 810. In some embodiments, the data required for processing may be stored in the RAM 815. The stored instructions may be further compiled to generate other representations of the instructions and dynamically stored in the RAM 815. The processor 805 reads instructions from the RAM 815 and performs actions as instructed. According to one embodiment, the computer system 800 further includes an output device 825 (e.g., a display) to provide at least some of the results of the execution as output including, but not limited to, visual information to users and an input device 830 to provide a user or another device with means for entering data and/or otherwise interact with the computer system 800. The output devices 825 and input devices 830 could be joined by one or more additional peripherals to further expand the capabilities of the computer system 800. A network communicator 835 may be provided to connect the computer system 800 to a network 850 and in turn to other devices connected to the network 850 including other clients, servers, data stores, and interfaces, for instance. The modules of the computer system 800 are interconnected via a bus 845. Computer system 800 includes a data source interface 820 to access data source 860. The data source 860 can be accessed via one or more abstraction layers implemented in hardware or software. For example, the data source 860 may be accessed by network 850. In some embodiments the data source 860 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open Database Connectivity (ODBC), produced by an underlying software system, e.g., an enterprise resource planning (ERP) system, and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the one or more embodiments can be practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the embodiment are described herein for illustrative purposes, various equivalent modifications are possible within the scope of the embodiments, as those skilled in the relevant art will recognize. These modifications can be made to the embodiments in light of the above detailed description. Rather, the scope of the one or more embodiments is to be determined by the following claims, which are to be interpreted in accordance with established doctrines of claim construction.

What is claimed is:

1. A non-transitory computer readable storage medium storing instructions, which when executed by a computer cause the computer to:

receive a request for creating a mnemonic associated with an application;

upon receiving the request, display a menu including multiple options for creating different types of mnemonic, wherein the menu is displayed as a floatable overlay on a current presentation of the application;

receive a selection of an option from the multiple options of the menu;

based upon the selection of the option, determine whether to include a new entity having a predefined template within the mnemonic or to include an existing entity within the mnemonic; and based upon the determination, render one or more pop-up windows for creating the mnemonic, wherein the created mnemonic is a floatable overlay on a graphical user interface (GUI), floats over a plurality of UIs associated with the application and is movable over the GUI content to enable users to create notes without leaving the GUI content.

2. The computer readable medium of claim 1, wherein the request is received upon selecting a mnemonic icon from a graphical user interface.

3. The computer readable medium of claim 1, wherein the entity comprises one of an object, a note, a task, a reminder, and a process.

4. The computer readable medium of claim 1, wherein the multiple options comprise a 'create' option, an 'object' option, a 'notes' option, a 'task' option, a 'reminder' option, and a 'process' option, and a type of the different types of mnemonic is one of an object, a note, a task, a reminder, and a process based upon the selection of the option from the multiple options.

5. The computer readable medium of claim 4, wherein the 'object' option enable loading an existing object into the mnemonic, the 'notes' option enable loading an existing notes into the mnemonic, the 'task' option enable loading an existing task into the mnemonic, the 'reminder' option enable loading an existing reminder into the mnemonic, and the 'process' option enable loading an existing process into the mnemonic.

6. The computer readable medium of claim 4 further comprising instructions, which when executed by the computer cause the computer to:

upon selection of the create option, display a create menu including at least one of one or more objects, one or more processes, and one or more tasks;

receive a selection of one of an object from the one or more objects, a process from the one or more processes, and a task from the one or more tasks; and based upon the selection, provide the new entity having the predefined template with a set of predefined fields for creating the mnemonic.

7. The computer readable medium of claim 1 further comprising instructions, which when executed by the computer cause the computer to provide one or more options for saving and sharing the mnemonic, wherein the saving option further comprises options for saving the mnemonic as one of a draft, a template, and a tile and the sharing option provides at least one of one or more recipients and one or more mediums for sharing the mnemonic.

8. The computer readable medium of claim 1 wherein the pop-up windows provide option for entering content comprising at least one of a text, a data, a note, an object, and a process into the mnemonic using one or more user interface (UI) operations including at least one of a drag-and-drop operation, selection from a menu, and typing with content recognition.

9. The computer readable medium of claim 1, wherein the mnemonic comprises at least one of:
   one or more display elements comprising at least one of a content from the GUI and an input data from a component of a device on which the request for creating the mnemonic is received, wherein the component comprise at least one of a camera and a microphone and wherein the content is included within the mnemonic using a user interface (UI) operation comprising at least one of a drag-and-drop operation, selection from a menu, and typing with content recognition; and
   one or more action elements, wherein an action element is one of a context-specific element and a generic element including one of a close button and a maximize button.

10. The computer readable medium of claim 1, wherein one or more mnemonics are displayed in a list and wherein a filter option is provided to filter the list based upon at least one of a type of mnemonic of different types of mnemonic, a user, and a context.

11. A computer-implemented method for creating dynamic mnemonics, the method comprising:
   receiving a request for creating a mnemonic associated with an application;
   upon receiving the request, displaying a menu including multiple options for creating different types of mnemonic, wherein the menu is displayed as a floatable overlay on a current presentation of the application;
   receiving a selection of an option from the multiple options of the menu; based upon the selection of the option, determining whether to include a new entity having a predefined template within the mnemonic or to include an existing entity within the mnemonic; and
   based upon the determination, rendering one or more pop-up windows for creating the mnemonic, wherein the created mnemonic is a floatable overlay on a graphical user interface (GUI), floats over a plurality of UIs associated with the application and is movable over the GUI content to enable users to create notes without leaving the GUI content.

12. The computer-implemented method of claim 11, wherein the multiple options comprise a 'create' option, an 'object' option, a 'notes' option, a 'task' option, a 'reminder' option, and a 'process' option.

13. The computer-implemented method of claim 12 further comprising:
   upon selection of the create option, displaying a create menu including at least one of one or more objects, one or more processes, and one or more tasks;
   receiving a selection of one of an object from the one or more objects, a process from the one or more processes, and a task from the one or more tasks;
   based upon the selection, providing the new entity having the predefined template with a set of predefined fields for creating the mnemonic; and
   providing one or more options for saving and sharing the mnemonic.

14. A computer system for mnemonics, the system comprising:
   at least one memory to store executable instructions; and
   at least one processor communicatively coupled to the at least one memory, the at least one processor configured to execute the executable instructions to:
      receive a request for creating a mnemonic associated with an application;
      upon receiving the request, display a menu including multiple options for creating different types of mnemonic, wherein the menu is displayed as a floatable overlay on a current presentation of the application;
      receive a selection of an option from the multiple options of the menu;
      based upon the selection of the option, determine whether to include a new entity having a predefined template within the mnemonic or to include an existing entity within the mnemonic; and
      based upon the determination, render one or more pop-up windows for creating the mnemonic, wherein the created mnemonic is a floatable overlay on a graphical user interface (GUI), floats over a plurality of UIs associated with the application and is movable over the GUI content to enable users to create notes without leaving the GUI content.

15. The system of claim 14, wherein the multiple options comprise a 'create' option, an 'object' option, a 'notes' option, a 'task' option, a 'reminder' option, and a 'process' option, and wherein the 'object' option enable loading an existing object into the mnemonic, the 'notes' option enable loading an existing notes into the mnemonic, the 'task' option enable loading an existing task into the mnemonic, the 'reminder' option enable loading an existing reminder into the mnemonic, and the 'process' option enable loading an existing process into the mnemonic.

16. The system of claim 15, wherein the processor is further configured to execute the executable instructions to:
   upon selection of the create option, display a create menu including at least one of one or more objects, one or more processes, and one or more tasks;
   receive a selection of one of an object from the one or more objects, a process from the one or more processes, and a task from the one or more tasks;
   based upon the selection, providing the new entity having the predefined template with a set of predefined fields for creating the mnemonic; and
   provide one or more options for saving and sharing the mnemonic.

17. The system of claim 16, wherein the saving option further comprises options for saving the mnemonic as one of a draft, a template, and a tile and the sharing option provides at least one of one or more recipients and one or more mediums for sharing the mnemonic.

18. The system of claim 14, wherein the mnemonic comprises at least one of:
   one or more display elements including at least one of:
      a content from the GUI, wherein the content is included within the mnemonic using a user interface (UI) operation comprising at least one of a drag-and-drop operation, selection from a menu, and typing with content recognition; and
      an input data from a component of a device on which the request for creating the mnemonic is received; and one or more action elements including at least one of: a context-specific element; and a generic element including at least one of a close button and a maximize button.

19. The system of claim 14, wherein one or more mnemonics are displayed in a list including a filter option to filter the list based upon at least one of a type of mnemonic, a user, and a context.

* * * * *